Figure 2:
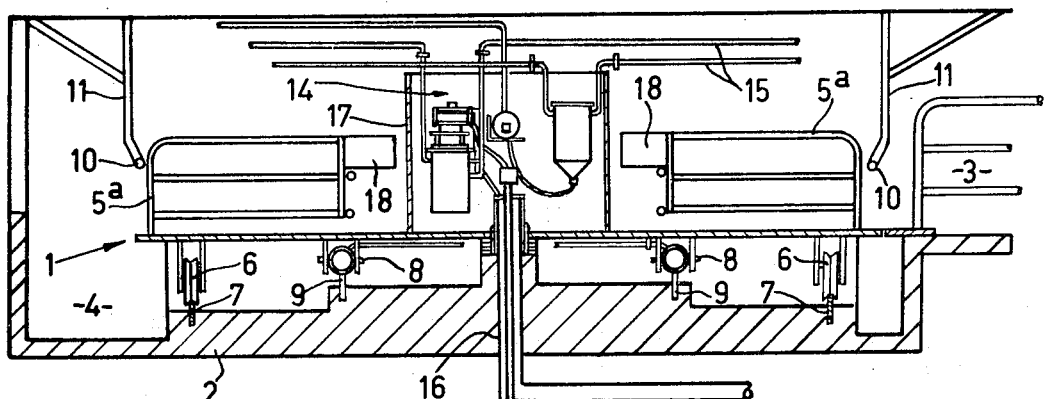

United States Patent [19]
Hicks

[11] 3,709,196
[45] Jan. 9, 1973

[54] ANIMAL MILKING AND/OR TREATMENT APPARATUS

[75] Inventor: Mervyn Lance Hicks, Taranaki, New Zealand

[73] Assignee: Turn-Styles Limited, Stratford, New Zealand

[22] Filed: Jan. 29, 1971

[21] Appl. No.: 110,822

[52] U.S. Cl............................................119/14.04
[51] Int. Cl...............................................A01j 05/00
[58] Field of Search....................................119/14.04

[56] References Cited

UNITED STATES PATENTS

| | | | |
|---|---|---|---|
| 3,103,912 | 9/1963 | Benedetto | 119/14.04 |
| 2,305,259 | 12/1942 | Jeffers, Jr. | 119/14.04 |
| 3,095,854 | 7/1963 | Bott et al | 119/14.04 |
| 3,116,713 | 1/1964 | Darling | 119/14.04 |
| 3,033,161 | 5/1962 | Babson | 119/14.04 |

FOREIGN PATENTS OR APPLICATIONS 377,580   6/1964   Switzerland

*Primary Examiner*—Hugh R. Chamblee
*Attorney*—Watson, Cole, Grindle & Watson

[57] ABSTRACT

Apparatus particularly intended for use in milking animals and including a horizontal circular platform which is mounted for rotation about a central vertical axis and is arranged to be driven either intermittently or at a slow rate by any suitable prime mover means. The platform has its peripheral part divided into a plurality of animal receiving stalls disposed generally radially, or at a slight angle to the radial line, opening to the periphery of the platform and directed inwardly thereof so that the animals hind quarters are at said periphery to be accessible to an operator outside the platform. In the preferred construction and application of the invention as milking apparatus, each stall is provided with a milking claw and cup assembly connecting with milk collection pipe lines and air or vacuum pipe lines fixed relative to the platform and rotatable with such platform. The milk collection and air or vacuum pipe lines can pass to milking apparatus located centrally of the platform and rotatable therewith, or the arrangement can provide for the rotatable milk collection and air or vacuum supply lines to connect either directly or by way of a milk receiving can with a central revolving gland unit which is in turn connected by fixed pipe lines to the remainder of the milking machinery and apparatus. The speed of rotation of the platform is preferably such that the milking of each animal will be completed by the time one revolution of the platform is completed so that an animal may pass forwardly through an entrance into a stall on the platform and when the revolution is completed and milking finished the animal may back out of the stall off the platform and through an exit adjacent the entrance.

14 Claims, 5 Drawing Figures

ANIMAL MILKING AND/OR TREATMENT APPARATUS

This invention relates to animal milking and/or treatment apparatus and is more particularly concerned with the provision of apparatus including pens or stalls where in farm animals such as cows can be located and milked, although it is to be appreciated that the invention may have other applications for other treatments of many animals.

An object of this invention is to provide a milking or other treatment platform on which animals can be easily and quickly located and subsequently removed with a minimum of effort and time on the part of an operator or operators, the arrangement of the apparatus providing for efficient operation and utilization of space within such as a milking or other treatment shed. Small versions of the entire apparatus may be also easily operable by a single operator, and larger versions with a minimum of operators, and other objects and advantages of the invention will become apparent from the ensuing description.

According to this invention there is provided animal milking and/or treatment apparatus comprising a horizontal platform which is mounted on support means for rotation about a vertical axis, said platform being divided into a plurality of animal receiving stalls, opening to the periphery of the platform and directed inwardly thereof so that the animals hind quarters are at said periphery to be accessible to an operator outside the platform, there being prime mover means for rotating the platform, and milking and/or treatment equipment at least part of which is mounted for rotation with the platform about said vertical axis.

Figure 1:
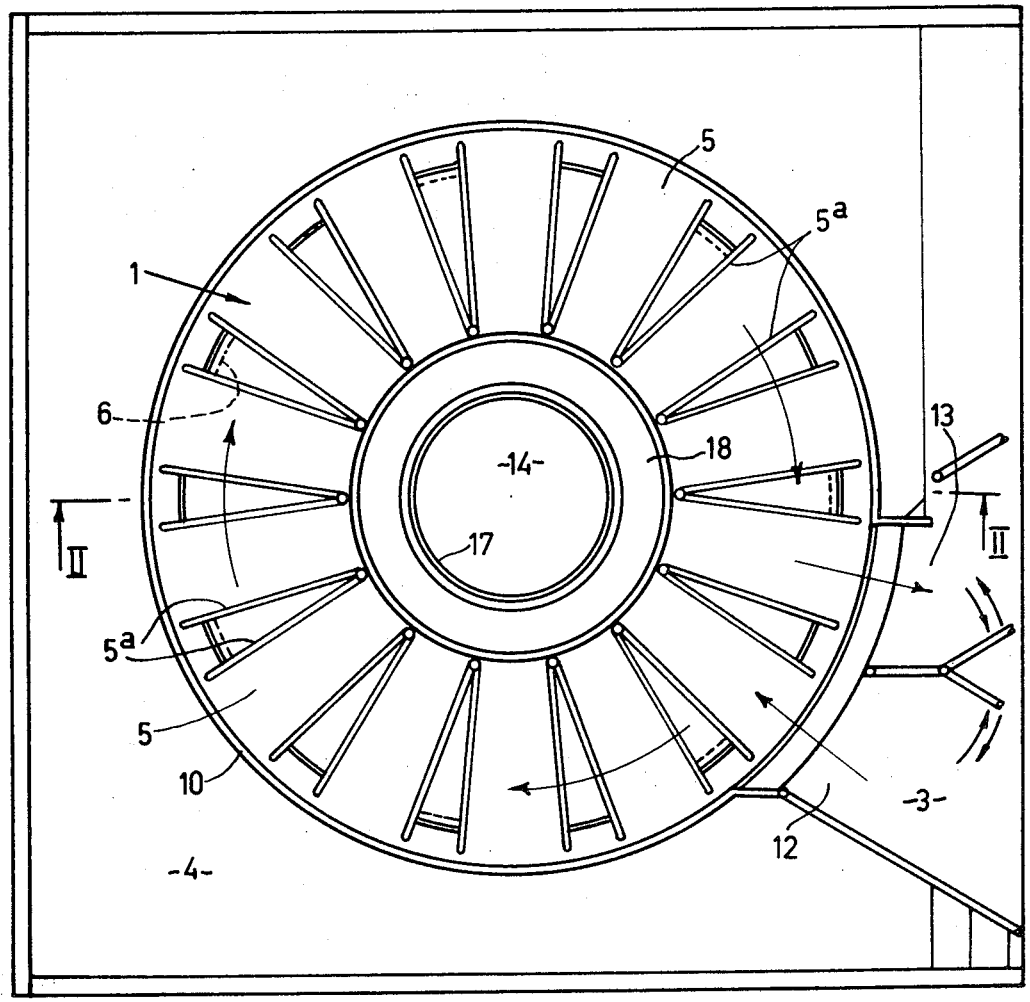
Figure 4:
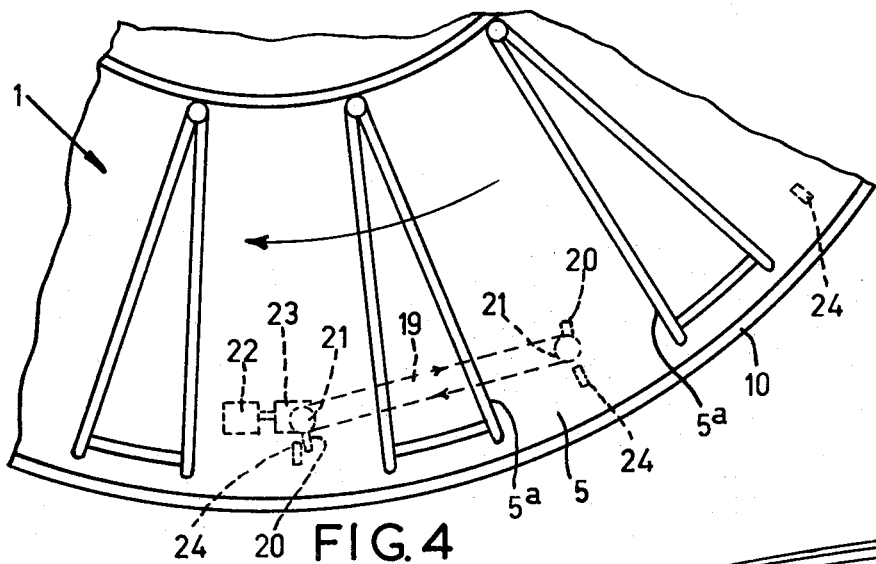
Figure 3:
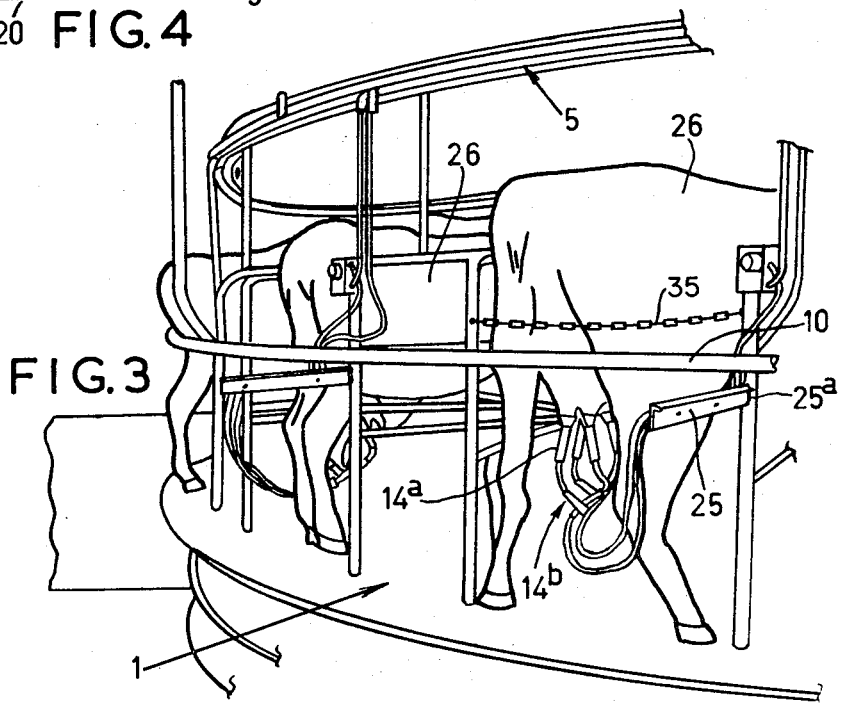
Figure 5:
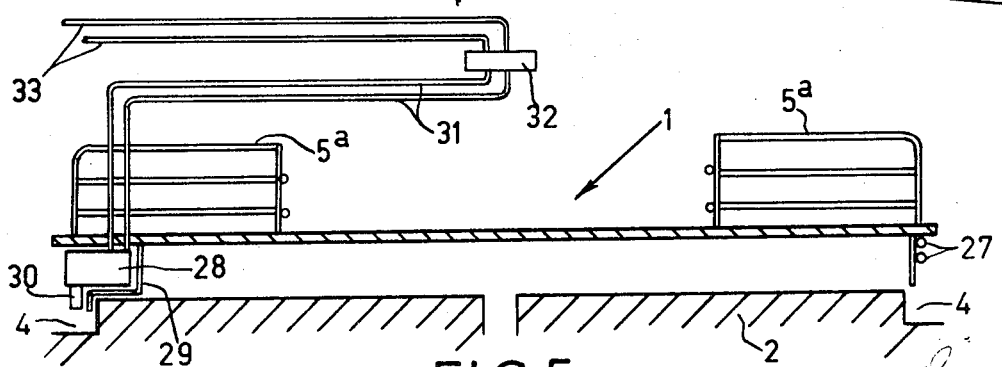

As previously indicated, the invention is particularly applicable to the milking of cows and one form of the invention will now be described by way of example with reference to such an application and the accompanying drawings, in which:

FIG. 1 is a diagrammatic plan view illustrating a typical preferred layout and disposition of a rotary milking platform, FIG. 2 is a partially diagrammatic but more detailed sectional view on line II—II of FIG. 1, FIG. 3 is a side perspective view of a fragment of the apparatus in use, FIG. 4 is a diagrammatic plan view of a fragment of the apparatus and illustrating a modification thereof, and FIG. 5 is a diagrammatic cross-sectional view, viewed in the same general way as FIG. 2, incomplete for clarity and illustrating a further modification of the invention.

The rotatable platform, generally indicated by the arrow 1, is circular in formation and is mounted for rotation above a base 2 which may be constructed from concrete, for example. As illustrated, the base 2 is preferably sunken relative to an adjacent drafting yard or race 3, which may be such as a circular holding or drafting yard, so that the platform 1 itself is substantially level with the floor of such drafting yard, and for the convenience of an operator a sunken walk-way 4 is provided around the outside of the platform 1 at a convenient height so that an operator may attach the cups 14a of a milking claw 14b to the teats of an animal 26 without having to stoop and/or an operator may inspect and/or treat the under parts of an animal 26 and/or inspect any attached apparatus with a minimum amount of stooping. Alternatively the platform 1 can be raised relative to the yard or race 3 and floor on which an operator will stand, and entrance/exit ramps provided up to such platform 1 from the yard or race 3.

The platform 1 itself may be constructed from metal plate which can be chequered or roughened or provided with a non-slip material on its upper surface to reduce slip by an animal 26; and the upper side of the platform 1 is divided by upstanding walls or rails 5a into a plurality of stalls 5 which, in a preferred construction, are generally radially disposed or at a slight angle to the radial line and are of restricted width so that an animal 26 located therein cannot move about a great deal and has its head located towards the center of the apparatus and its rear towards the outer periphery of the circular platform 1 so that the animals udders are readily accessible to an operator in the walk-way 4 surrounding such circular platform 1. This arrangement provides for the maximum number of animals 26 to be accommodated on a platform 1 which is relatively small in diameter when compared with known rotary milking platforms on which animals are disposed in a concentric line at the platform periphery.

The inner ends of the stalls 5 can be provided with such as individual feed boxes 18, or an annular concentric feed trough may be provided adjacent the inner ends of the stalls and in this latter arrangement it is envisaged that such as a feed hopper or automatic feed mechanism (not shown) can be included in the apparatus.

The platform 1 is provided on its underside and towards the periphery thereof with a plurality motors equally spaced wheels 6 having radial axes, and such wheels 6 are arranged to locate and run upon an annular concentric track 7 provided in or on the base support 2. The center part of the rotatable platform 1 may be rotatable on or about an upstand at the center of the base 2 and one or more of the outer supporting wheels 6 for the platform 1 may be driven by any suitable means or an inner independent driving means can be provided. In one form of the invention one or more inner electric motors 8 are mounted on the underside of the platform 1 and are arranged to drive a gear wheel such as a work or other gear wheel which is co-operable with an annular rack 9 on the base 2 and disposed concentrically with the axis of rotation of the platform 1. Alternatively, but not illustrated, pneumatic or hydraulic ram units can be substituted for the inner electric motor 8 and disposed above and in general alignment with the rack 9; the free end part of each ram being provided with a downwardly projecting ratchet tooth or lug for engagement and co-operation with the rack 9 so that extension and retraction of each ram can effect intermittent rotary movement of the platform 1. Other means of driving the platform 1 about its axis may be provided and in a further arrangement, illustrated diagrammatically in FIG. 4 of the drawings, an endless link chain 19 having one ore more 'pick-up' projections 20 is located below the platform 1 and about a pair of chain wheels 21; at least one of said chain wheels 21 is arranged to be driven continuously by such as an electric motor 22 and speed reduction means 23, and the chain 'pick-up' projections 20 are arranged to engage and move each of a plurality of depending lugs or brackets 24 fixed to the underside to the platform 1 on the same pitch circle, one run of the chain 19 being disposed adjacent the pitch circle and the platform lugs 24 being equally spaced on their pitch circle at distances not greater than the distance between the centers of the chain wheels 21, and thus continuously or intermittently move the platform 1.

The animals 26 may be arranged to be tethered or the rear or outer end of each stall 5 may be provided with its own closable gate or closure member (a typical one of which being shown in FIG. 3) such as a bar, chain, rope or other flexible link 35, so that an animal 26 cannot back out from its stall 5 while the platform 1 is rotating. However, in a preferred form of the invention, and as illustrated, an annular horizontally disposed rail 10 is provided at and above the periphery of the circular platform 1 and in juxtaposition with the rear end of each stall 5 so as to be co-operable therewith in retaining an animal 26 in the desired position. The rail 10 does not rotate with the platform but may be maintained in position such as by hanger members 11 from the roof of the milking shed or from supports extending from the base or a wall thereto. An entrance 12 to the platform 1 from the holding or drafting yard 3 reducing to the approximate width of a stall 5 is provided adjacent an exit 13 of similar dimensions and the annular retaining rail 10 is gapped at such entrance and exits 12 and 13.

The platform 1 may be arranged to rotate at a constant or intermittent slow speed, as previously indicated, and preferably at a rate such that one revolution is adequate for the average milking time of one animal 18. Thus an animal may pass from the drafting or holding yard 3 through the entrance 12 to a stall 5 on the rotating platform 1 while the platform 1 is being rotated at its slow rate and, on being coupled to the milking equipment 14 by way of the milking claw 14b and teat cups 14a, the animal 26 will be milked while it is being rotated with the platform 1; and just prior to the stall 5 completing its one revolution and approaching the exit 13 from the platform 1 the milking claw 14b may be removed and the animal thus becomes free to step backwards from the stall 5 through the gap in the retaining rail 10 at the exit 13. However, it will be appreciated that animals requiring longer than average milking may be left on the platform 1 to complete a further revolution or part thereof before being permitted to step off the platform 1. Similarly, animals requiring less than the average time for milking may have the teat cups 14a removed during any part of a revolution of platform 1 and, where it is desired to say hand strip the animals teats or perform any other operation before the animals leave the platform 1, then the platform 1 can be stopped or slowed further so that the actual milking time for an animal extends over say, the time it takes for three quarters of a revolution of the platform 1.

As illustrated particularly in FIG. 2 of the drawings, the milking equipment or a major part thereof (generally indicated by the arrow 14), and which may include the usual electric motor or motors, pump or pumps, and milk reservoir or collection chamber, can be located in the center part of the platform 1 and so as to be rotated therewith; appropriate vacuum supply and milk collection lines being passed to each stall 5 such as by overhead pipe lines 15 which may be self-supporting.

The centrally located part of milking equipment 14 (when provided) can be separated from the stalls 5 by an annular wall 17 so that the outer part of the platform 1 on which animals 26 have been standing can be washed without adversely affecting or contacting the central milking equipment 14 and associated mechanism.

Alternatively, only a milk reservoir, or collection chamber or pipe, may be mounted also in the center part of the platform 1 to be rotatable therewith or the milk collected may be passed from the milking claws 14b by any suitable means to a fixed receiving tank or container remote from the platform 1, the vacuum to the claws 14b and cups 14a being also supplied from an external source via a central feed pipe.

In one modification of the invention, illustrated by way of example in FIG. 5 of the drawings, a "low-line" construction may be provided wherein milk collection and air or vacuum supply pipe lines 27 are located at the periphery of the platform 1 and below the level thereof with the flexible vacuum and milk collection lines to each milking claw 14b (not shown in FIG. 5) connected to the respective lines 27 at each stall 5. The peripheral milk and air or vacuum lines 27 are fixed relative to and rotatable with the platform 1, and such lines 27 pass to at least one milk receiving can 28 which can be located at or near the periphery and below the level of the platform 1, such as in a recessed area 29 provided below the platform 1, and is also rotatable with the platform 1. A pump unit 30 is also provided at the milk receiving can 28 but the remainder of the milking machinery and apparatus required (including a bulk milk receiving tank) can be located remote from the platform 1, milk and air/vacuum lines 31 (rotatable with the platform 1) passing from the milk receiving can 28 to a centrally mounted revolving gland unit 32 and there being further fixed and non rotatable milk and air/vacuum lines 33 extending from the gland unit 32 to the remote machinery and apparatus (not shown). As illustrated in FIG. 5, the lines 31 can extend upwardly from the receiving can 28 and inwardly above the platform to the gland unit 32 which may be mounted above animal height, and the lines 33 extending from the gland unit 32 can also extend overhead to the remote machinery and apparatus; however it is envisaged that the lines 33 from the gland unit can pass downwardly through a central duct in the platform 1 and base 2 and/or that the gland unit 32 can be disposed at or below the level of the platform 1 with the lines 31 to the gland unit 32 from the receiving can 28 passing below the platform 1. The 'below platform' arrangement may provide a clearer upper area but the 'above platform' arrangement may provide better accessibility to the pipe lines 31 and 33, and the gland unit 32.

The milking claw 14b with teat cups 14a for each stall 5 can be supported above the platform 1 by an arm or bracket 25 which may extend from a pivotal connection 25a with the adjacent dividing wall or rail 5a so as to be readily accessible to an operator; and in a preferred arrangement of the invention (not illustrated), means are provided for retracting the teat cups flexible hoses into or at such arm 25 when the teat cups 14a are uncoupled from a cow. Such retraction of the hoses can be simultaneous with or effective slightly after the shutting off of vacuum pressure to the teat cups 14a and it is envisaged that such as an arm associated with the retracting mechanism can exert pressure on the outside of a flexible vacuum feed tube to cut off the vacuum to the teat cups 14a; by this arrangement an operator is not required to remove the teat cups 14a from a cow after milking as they will fall away from the cow on cutting off the vacuum supply and will be immediately retracted to a 'home' position on the appropriate support arm 25. Operation of the vacuum cut-off and hose retracting means can, by way of example, be effected remotely by an operator or by trip mechanism near the exit 13 to the platform 1 or by way of switch means associated with a milk flow meter, so that removal of the teat cups 14a takes place when milking is completed. The base mounting 2 may be provided with a central duct 15 which may serve as an exhaust duct from one vacuum pump provided for the milking operations and such duct may also serve to carry electric power supply lines to electric motors for the apparatus. Also, where it is desired to feed the milk to an outside reservoir or tank, or to provide the pumping and/or vacuum equipment outside the platform, then such duct may also carry a milk feed and/or vacuum supply pipes. As the platform 1 and at least the milking claws 14b and supply lines 15 of milking equipment 14 thereon are rotating, it will be appreciated that suitable sealing glands will be required to permit the equipment to rotate about a fixed milk outlet and/or main vacuum supply pipes. Appropriate rotatable electrical connections will also be required, where electric motors are provided to be rotatable with the platform 1.

Thus, by this invention, there is provided a rotary milking platform is convenient and easy to use by an operator or operators and thus provides for efficient milking operations to be carried out, and the entire apparatus is compact and occupies a relatively small amount of space when compared with known rotary milking platforms.

Particular forms of the invention have been described with reference to a particular application, namely milking operations, but it is envisaged that the apparatus without the milking equipment may have other applications in such as the treatment and/or inspection of animals and other modifications to and variations of the invention may therefore take place, without departing from the scope of the appended claims.

By way of example, it is envisaged that instead of individual stalls for each animal, the stalls can be made wide enough to accommodate say two animals, both adjacent with their heads directed to the center part of the platform and their rear parts at the periphery to be accessible to an operator outside the platform in accordance with the invention.

We claim:

1. Animal milking apparatus comprising a horizontal platform mounted on a base support for rotation about a vertical axis and including prime mover means for rotating the platform, the platform being provided on its upper side with a plurality of fixed animal receiving stalls and there being animal milking apparatus at least part of which is mounted for rotation with the platform, characterized in that the animal receiving stalls have fixed dividing walls, are elongated and have their longitudinal axes directed inwardly from the platform outer periphery, the outer end of each stall opening to said outer periphery and the inner ends of each stall being closed so that the animals may enter and leave the stalls at the outer periphery and so that, during use of the apparatus, the animals' s hind quarters are directed towards the platform outer periphery and are accessible to an operator outside the platform, and there being retaining means to retain the animals in their respective stalls during rotational movement of the platform while being milked.

2. Apparatus as claimed in claim 1 wherein the platform is raised relative to the floor on which an operator will stand at the periphery of the platform so that the operator may view or gain access to the under parts of the animal with a minimum amount of stooping.

3. Apparatus as claimed in claim 1 wherein the upper side of the platform is divided by upstanding walls or rails constituting the plurality of stalls which are substantially radially disposed.

4. Apparatus as claimed in claim 1 wherein an annular concentric feed through is provided adjacent the inner ends of the stalls.

5. Apparatus as claimed in claim 1 wherein the platform is provided on its underside and towards the periphery thereof with a plurality of equally spaced wheels have radial axes, such wheels being arranged to locate and run upon an annular track provided in or on the base, and at least one of said supporting wheels is arranged to be driven by the prime mover.

6. Apparatus as claimed in claim 1 wherein the platform is provided on its underside and towards the periphery thereof with a plurality of spaced wheels having radial axes and which are arranged to locate and run upon an annular concentric track provided in or on the base support, and there being at least one inner electric motor mounted on the underside of the platform and arranged to drive a gear wheel which is co-operable with an annular track on the base and disposed concentrically with the axes of rotation of the platform.

7. Apparatus as claimed in claim 1 wherein the platform is provided on its underside and towards the periphery thereof with a plurality of spaced wheels having radial axes and which are arranged to locate and run upon an annular concentric track provided in or on the base support, and there being at least one pneumatic or hydraulic ram unit provided on the underside of the platform and having a free end part of its ram provided with a downwardly projecting ratchet tooth or lug which is engageable and cooperable with an annular concentric rack on the base so that extension and retraction of each ram can effect in intermittent rotary movement of the platform.

8. Apparatus as claimed in claim 1 wherein the platform is provided on its underside with spaced wheels having radial axes and arranged to locate and run upon an annular concentric track provided in or on the base, and there being endless link chain having one or more 'pick-up' projections located below the platform and about a pair of chain wheels, at least one of said chain wheels being driven by a prime mover and the chain 'pick-up' projections being arranged to engage and move each of a plurality of depending lugs or brackets fixed to the underside of the platform on the same pitch circle, one run of the chain being disposed adjacent the pitch circle and the platform lugs being equally spaced on their pitch circle at distances not greater than the distance between the centers of the chain wheels.

9. Apparatus as claimed in claim 1 wherein the outer end of each stall is provided with its own closable gate or like closure member, constituting said retaining means, to prevent an animal backing out of its stall while the platform is rotating.

10. Apparatus as claimed in claim 1 wherein an annular horizontally disposed rail is provided at and above the periphery of the circular platform and in juxtaposition with the rear end of each stall so as to be cooperable therewith in retaining an animal in the desired position, the rail being fixedly mounted so as not to rotate with the platform and is gapped for at least the width of two stalls at the entrance and exits of a drafting yard or race adjacent the platform.

11. Apparatus as claimed in claim 1 wherein at least a major part of the milking apparatus, for use in milking animals on the platform and comprising motor and pump mechanism and a milk reservoir or collection chamber, is located in the center part of the platform so as to be rotatable therewith; vacuum supply and milk collection lines being passed to a milking claw and associated milking cups provided at the periphery of the platform and for each stall, the centrally located part of the milking apparatus mounted on the platform being separated from the stalls by an annular wall.

12. Apparatus as claimed in claim 1 wherein the milking apparatus includes a central milk reservoir, or collection chamber or pipe, which is rotatable with the platform and has pipe lines extending to milking claws and milking cups provided at the periphery of the platform for each stall, there being further pipe lines extending to a fixed receiving tank or container remote from the platform and vacuum pressure to the milking claws and milking cups being also supplied from an external source via a central feed pipe; the centrally located part of the milking equipment mounted on the platform being separated from the stalls by an annular wall.

13. Apparatus as claimed in claim 1 wherein milk collection and air or vacuum supply pipe lines of the milking apparatus are located at the periphery of the platform and below the level thereof with the flexible pipes of a milking claw and cup assembly being connected to the respective lines at each stall; the peripheral milk and air or vacuum lines being fixed relative to and rotatable with the platform and passing to at least one milk receiving can located at the periphery and below the level of the platform, said milk receiving can being also fixed relative to and rotatable with the platform; there being a pump unit at the milk receiving can with the remainder of milking machinery and apparatus required (including a bulk milk receiving tank) being located remote from the platform, milk and air or vacuum lines which are rotatable with the platform passing from the receiving can to a centrally located rotatable gland unit and there being fixed non-rotatable milk and air or vacuum lines extending between the gland unit and remote milking machinery and apparatus.

14. Apparatus as claimed in claim 1 wherein the milking apparatus includes a milking claw and milking cup assembly for each stall and which is supported above the platform by an arm or bracket extending from a pivotal connection with a wall or rail of the stall.

* * * * *